United States Patent [19]

Takino

[11] 3,959,497

[45] May 25, 1976

[54] ENZYMATIC SOLUBILIZATION OF TEA CREAM

[75] Inventor: Yoshinori Takino, Tokyo, Japan

[73] Assignee: The Coca-Cola Co., Atlanta, Ga.

[22] Filed: July 30, 1970

[21] Appl. No.: 54,016

[52] U.S. Cl. .................................. 426/52; 426/597
[51] Int. Cl.$^2$ .......................................... A23F 3/00
[58] Field of Search .............. 99/76, 77, 48; 426/52, 426/597

[56] References Cited

UNITED STATES PATENTS

| | | | |
|---|---|---|---|
| 2,223,753 | 12/1940 | Wallerstein | 99/48 |
| 2,831,772 | 4/1958 | Herz | 99/76 |
| 2,860,987 | 11/1958 | Werner | 99/48 |
| 3,065,077 | 11/1962 | Mishkin et al. | 99/77 |
| 3,151,985 | 10/1964 | Fobes | 99/76 X |
| 3,163,539 | 12/1964 | Barch | 99/76 X |

OTHER PUBLICATIONS

Chem. Abstracts; Smith vol. 69, (1968) 95239W.

Chem. Abstracts; Nishira vol. 61 7284a.

J. Sci. Food Agric. (3/10/59); Roberts et al. Part V & VI pp. 172–179.

Agr. Biol. Chem.; 32: 1070–1078; Yamada et al. Part 1 (1968).

Agr. Biol. Chem.; 28: 255–256; Takino et al., (1964).

J. Agr. Chem. Soc. Japan; 45, 176 (1971), Takino et al.

Chem. of Veg. Tannins; Haslam Academic Press, N.Y. pp. 102–104 (1966).

*Primary Examiner*—Steven L. Weinstein
*Attorney, Agent, or Firm*—John R. Martin

[57] ABSTRACT

A cold water-soluble tea concentrate or tea powder that when reconstituted gives a tea of improved astringency and color without turbidity is produced from tea extracts, and preferably black tea extracts, by treating the tea extract or tea cream with appropriate enzymes.

19 Claims, No Drawings

ENZYMATIC SOLUBILIZATION OF TEA CREAM

FIELD OF INVENTION

This invention relates to a novel method for solubilizing the cold water insoluble portion of extracted tea solids by the use of an appropriate enzyme, preferably the enzyme tannase. More specifically, the invention relates to a method for treating tea extracts, and preferably black tea extracts, to produce a water-soluble tea or tea powder of improved astringency and color without turbidity by contacting the tea extract or other medium containing the tea cream or the tea cream itself with an appropriate enzyme, preferably the enzyme tannase.

DESCRIPTION OF THE PRIOR ART

Green tea includes freshly gathered tea leaves, tea leaves that have been freshly gathered and dried immediately, tea leaves that have been heat treated before drying and aqueous extracts of these leaves. In each instance, the green tea has undergone substantially no fermentation to the black state.

Black tea, on the other hand, is generally made from green tea leaves by subjecting tea leaves to a series of processing conditions including (1) withering, (2) rolling or otherwise disintegrating, (3) fermenting and (4) firing. Rolling or other disintegration initiates the enzymic reactions of fermentation, during which the characteristic color, flavor and aroma of black tea are developed. When the fermentation has progressed sufficiently, the tea leaves are fired (i.e., dried). This arrests the enzymic reactions and the resulting product possesses the characteristic appearance of black tea. (See, for example, Millin, D. J. & Rustidge, D. W. (1967) Process Biochemistry 2 No. 6 page 9).

Black tea extracts or infusions as is well known in the art, are normally produced by a hot water countercurrent extraction process. Such processes are described, for example, in U.S. Pat. Nos. 2,902,368 2,912,334, 3,065,077 and 3,080,237, as well as other literature. Black tea extracts, and particularly dried black tea extracts, when made to beverage concentration, generally become turbid, if the beverage or extract is allowed to cool, for example to room temperature or lower. The turbidity is caused by precipitated tea materal, which in the trade is normally referred to as "cream". Clouding or creaming has been a serious obstacle to the preparation of a stable commercial tea concentrate and to its acceptability by the consumer of soluble tea powders for use in cool beverages.

It has been proposed to eliminate the objectionable clouding or creaming by incorporating certain agents in the concentrate which are said to have the property of maintaining the insoluble ingredients in solution. Suggested suitable agents include carbohydrates and various chemicals used to adjust the pH for the purpose. In other instances, it has been proposed to extract the tea with cold, rather than with hot, water to avoid the presence of the less soluble ingredients which cause the clouding. However, the problems of clouding or creaming have not been completely overcome by these methods.

In order to produce a turbidity-free, water-soluble instant tea or tea extract, and particularly one that is soluble in cold water, it is generally necessary to separate some or all of the cream from the extract. This is usually accomplished by cooling the extract to cause the cream to precipitate. The cream is then removed, for example, by centrifuging. The cream solids, normally removed by centrifuging, contain a substantial proportion of the desirable tea color and typical tea astringency, and thus the supernatant remaining after centrifuging no longer contains these proportions of the desirable tea color and tea astringency.

If desired, the removed cream may be chemically solubilized such as by means of oxidation at elevated pH and temperature. Suitable oxidants include oxygen and hydrogen peroxide. pH is elevated using a basic material such as, for example, sodium hydroxide or potassium hydroxide. After oxidation, pH may be lowered using edible acids such as phosphoric or acetic acid. The supernatant fraction and the solubilized cream fraction may then be recombined, concentrated, and dried. Alternatively, all or a portion of the cream may be discarded. The drying may be accomplished, for example, by spray-drying, vacuum drying or freeze drying. However, if the chemical solubilization procedures on the cream are followed, much of the desirable tea color properties and typical tea astringency are destroyed or significantly reduced and a substantial portion of the natural color and flavor properties of the tea solids is lost.

The amount of cream removed by centrifuging varies with the leaf tea used in the extraction, the concentration of the tea extract, the temperature of the extract, and the gravitational force supplied by the centrifuge. The amount of cream removed, for example, at 7°C may be in the range between 20 and 35% of the extracted tea solids if the extract is at high concentrations (5 to 10% solids concentration) and as low as 4 to 8% if the extract is at lower concentrations (for example, 0.5 to 1% solids concentration).

SUMMARY OF THE INVENTION

It is an object of the present invention to produce water-soluble tea concentrates and powders, and more specifically, cold water soluble tea concentrates and powders containing most of the original natural properties of tea. It is another object of the invention to produce water-soluble tea concentrates and powders containing most of the original astringency and color, without producing the undesirable turbidity. It is yet another object of the invention to produce such water-soluble tea concentrates or powders from black tea extract.

It is a further object to provide a method for solubilization of tea cream. It is yet a further object of the invention to reduce or eliminate the need for inorganic or organic material used in the normal solubilization of tea cream. Their reduction or elimination increases the strength of the tea flavor per unit weight of processed tea solids.

In accordance with the present invention, there is provided a process for solubilizing tea cream comprising treating an aqueous suspension of tea cream or the tea cream with an enzyme preparation capable of converting at least a portion of the insoluble solids of the tea cream to a cold water-soluble form, for a time sufficient to reduce the proportion of cold water-insoluble solids to a desired level. The preferred sources of enzymes are tannase producing molds, for example *Aspergillus oryzae, Aspergillus niger* or *Aspergillus flavus*. The preferred form of tea extract is a black tea extract.

DETAILED DESCRIPTION OF THE INVENTION

The treatment is preferably conducted at an elevated temperature and after the treatment the enzyme preferably is removed from the treated suspension and the resultant solution cooled.

The enzyme preparation in soluble or insoluble powder form or in solution may be added to the tea extract at extract temperatures ranging from 25° to 55°C, preferably about 45°C. The incubation period may be about 30 minutes to one hour and longer at lower temperatures. The enzyme is effective over a range of tea extract pH from about 4.0 to about 7.0 with a preferred pH being in the range 5.0 to 6.0. Of course, if an insoluble powder form of enzyme is used, it may be desirable to recover the enzyme.

The whole tea liquor may be treated with the tannase preparation prior to any centrifuging step. In the alternative, the whole tea liquor may be centrifuged prior to treatment with the tannase preparation. The isolated tea cream may be treated, or the isolated tea cream may be resuspended, for example to a 4% solids suspension, prior to treatment with the tannase preparation. This latter method, however, entails an additional centrifuging may be added to the original supernatant. Any remaining cream may be discarded or treated, for example by a chemical solubilization method, if desired.

The amount of enzyme preparation to be used will vary depending upon the enzymic activity of the particular preparation. For example, about 0.5% by weight, based on the weight of tea solids, of *Aspergillus oryzae* having an activity of about 14 units per milligram will produce satisfactory results. Activity of the tannase may be determined by titration with sodium hydroxide of the gallic acid released from tannic acid by the action of the enzyme and is expressed in millimoles of hydrolyzed ester bond in tannic acid/mg enzyme powder/min. (See, Journal of Fermentation Technology (Japan), Vol. 45, pages 233–240, (1967).

If it is desired to maintain a pH of 5.5 throughout the incubation period, a buffer, such as McIlvaine's (a phosphatecitrate buffer) may be used.

In the following examples that are used to illustrate the invention, percentages are by weight unless otherwise indicated.

EXAMPLE I

One gram of black tea was extracted with 50 ml. of boiling water for five minutes. Four ml. of the filtered extract was then mixed with one ml. of enzyme solution prepared by dissolving five mg. of partially purified tannase (23 units/mg. activity) from *Aspergillus oryzae* in 50 ml. of McIlvaine's buffer at a pH of 5.5. The solution was allowed to stand at 30°C for 60 minutes. Another four ml. of the above tea extract was mixed with one ml. of McIlvaine's buffer only. After incubation, the solutions were held at various temperatures for 30-minute periods, and the turbidity of the solution was measured in the turbidimeter. The following results were obtained:

TABLE 1

| Standing Temperature for 30 Minutes | Turbidity (%) Control | Enzyme Treated |
|---|---|---|
| 20°C | 15 | 5 |
| 15°C | 35 | 7 |
| 10°C | 60 | 7.5 |

TABLE 1-continued

| Standing Temperature for 30 Minutes | Turbidity (%) Control | Enzyme Treated |
|---|---|---|
| 5°C | 80 | 8 |

The enzyme treated samples were further stored at about 5°C for two days without any increase in the turbidity.

EXAMPLE II

About 200 ml. of approximately 6% filtered black tea extract was divided into five samples. Four of the samples were adjusted to several temperatures, i.e., 23, 36, 45 and 55°C and 0.43% by weight of tea solids of tannase preparation from *Aspergillus oryzae* (activity 14 units per mg) added.

The samples with tannase added were incubated with mechanical shaking at each of the above temperatures for 15 minutes. A portion was removed from each of the samples, and the pH of each portion, which had decreased to 4.5 from the normal tea pH of 5.0, was adjusted to 5.0 by addition of sodium hydroxide solution. The portions were then cooled to 7°C and after a suitable equilibration period, centrifuged at 12,000 rpm for 10 minutes, in a refrigerated International centrifuge, maintaining the extract temperature at 7°C during centrifuging. After centrifuging, the solids concentration in the supernatant was determined and subtracted from the solids concentration of the whole liquor to obtain the amount of 7°C insolubles (cream).

Another portion was removed from each of the samples incubated at the above temperatures for a 30-minute period. The pH of these portions was adjusted to 5.0 as before. The portions were then cooled, centrifuged and solids determinations made as before, to obtain the amount of cream.

The last portion was removed from each sample after a 60-minute incubation period at the temperatures given above and the procedure repeated.

An untreated sample of 6% tea extract was incubated at each of the four temperatures for 60 minutes and subsequently cooled, centrifuged and solids determinations made on these as with the treated samples. The following table shows the results obtained in this experiment.

TABLE 2

| Incubation Temperature (°C) | Percentage 7°C Insolubles (based on total tea solids) | | | |
|---|---|---|---|---|
| | Untreated 60 Minutes | Tannase Treated | | |
| | | 15 Min. | 30 Min. | 60 Min. |
| 23 | 31.6 | 17.7 | 17.9 | 13.9 |
| 36 | 29.6 | 14.0 | 12.9 | 11.6 |
| 45 | 27.2 | 9.5 | 8.4 | 8.0 |
| 55 | 28.5 | 11.8 | 10.8 | 8.3 |

EXAMPLE III

About 200 ml. of an approximately 6% black tea extract was divided into four samples. One sample was adjusted to a pH of 4.0 by use of an appropriate acid; for example, phosphoric acid. The pH of another sample was adjusted to 6.0, and of another 7.0, by the use of an appropriate base; for example, sodium hydroxide. The pH of one sample was left unaltered at 5.0. A tannase preparation (*Aspergillus oryzae*, 14 units per mg activity) was added at the rate of 0.43% based on tea solids and mixed well.

Each of the samples was incubated with shaking for 30 minutes at 45°C. After the incubation period, the pH of each was adjusted to 5.0, with appropriate acid or base. The samples were then cooled to 7°C, centrifuged at 12,000 rpm for 10 minutes in a refrigerated International centrifuge. Solids determinations of the supernatant and the uncentrifuged extracts were made to obtain the amount of 7°C insolubles.

A sample without enzyme was incubated with shaking at the same temperature for the same length of time, at the natural pH of 5.0, and 7°C insolubles determined as above. The results of this experiment are given in the table below.

Table 3

| pH Before Incubation | Percentage 7°C Insolubles (based on weight of total tea solids) at Extract pH of 5.0 | |
|---|---|---|
| | Enzyme Treated | Untreated |
| 4.0 | 12.6 | |
| 5.0 | 9.3 | 27.2 |
| 6.0 | 10.5 | |
| 7.0 | 11.7 | |

EXAMPLE IV

About 300 ml. of a black tea extract at approximately 6% solids concentration was divided into three samples. The samples were brought to an incubation temperature of 45°C. To one sample was added 0.086% (by weight of tea solids) of tannase preparation (from *Aspergillus oryzae*) having an activity of 14 units per mg; to another was added 0.43% of the same tannase preparation; and to a third was added 0.86% tannase preparation.

After an incubation period of 30 minutes with shaking, pH's of the samples were adjusted to 5.0, the samples were cooled, centrifuged and solids determinations made as in Example III. The results are given in the following table.

Table 4

| Enzyme Concentration (%) | Percentage of 7°C Insolubles Based on Total Tea Solids |
|---|---|
| 0.086 | 17.3 |
| 0.43 | 8.4 |
| 0.86 | 8.3 |

EXAMPLE V

Test A

Approximately 200 ml. of a 6% black tea extract was divided into two samples. One sample was incubated with 0.43% (by weight of tea solids) tannase preparation (*Aspergillus orzyae* 14 units per mg activity) for 30 minutes at 45°C with shaking. A sample without enzyme was incubated for the same period. After the incubation, portions of these samples were cooled, centrifuged, (both at pH of 5.0) and solids determinations made of the supernatants and the uncentrifuged extracts, to obtain the amount of 7°C insolubles.

Test B

Another portion of each of these samples was diluted after incubation to approximately 1% solids concentration. These were then cooled, centrifuged and solids determinations made as before.

Test C

Another sample of the 6% tea extract was diluted directly to 1% solids concentration. Half was incubated with 0.43% tannase preparation and half was incubated at the same temperature for the same length of time without enzyme. After incubation, the samples were cooled, centrifuged and solids determinations made as before. The results are shown in the following table.

Table 5

| Test | Enzyme Treatment | Percentage Solids Before Treatment | Percentage Solids Before Centrifuging | Percentage 7°C Insolubles (base on tea solids) |
|---|---|---|---|---|
| A | None | 5.8 | 5.8 | 29.0 |
| | Tannase | 5.9 | 5.9 | 10.2 |
| B | None | 5.9 | 1.0 | 8.3 |
| | Tannase | 5.9 | 1.0 | 3.8 |
| C | None | 1.0 | 1.0 | 8.0 |
| | Tannase | 1.0 | 1.0 | 4.0 |

EXAMPLE VI

Approximately 1,000 ml. of about 6% black tea extract was incubated with 0.6% tannase preparation (*Aspergillus oryzae*, 10 units per mg activity) for one hour at 50°C with intermittent stirring. The pH of the extract was adjusted from 4.5 to the normal pH of 5.0 using a sodium hydroxide solution, and was then cooled and centrifuged at 12,000 rpm for 10 minutes at 7°C in a refrigerated International centrifuge. The solids of the whole liquor and supernatant were determined, and the amount of 7°C insolubles was calculated to be 7.9%. An untreated sample (1,000 ml.) of the same tea extract had 27.0% of 7°C insolubles.

The supernatant from the tannase treated extract, containing 92.1% of its tea solids, was evaporated on a rotary evaporator to approximately 40% solids, and was then dried in a laboratory Niro spray dryer. The resulting powder, when added to 7°C tap water at beverage strength (0.435%) produced a very clear solution of tea solids of pleasant reddish tea color and tea astringency.

The supernatant from the untreated sample, containing 77% of its tea solids was also evaporated on a rotary evaporator, and dried in a laboratory Niro spray dryer. Powder made from the untreated supernatant, when added to 7°C tap water at beverage strength (0.435%) also produced a clear solution, but the beverage was very pale yellow and had no astringency.

EXAMPLE VII

Approximately 3,000 ml. of about 6% black tea extract was incubated with 0.43% tannase preparation (*Aspergillus oryzae*, 14 units per mg activity) for one hour at 50°C with intermittent stirring.

The extract was cooled, centrifuged at 14,000 rpm for 10 minutes at 7°C. Solids concentration in thw whole liquor and supernatant were determined and the amount of insolubles at 7°C was calculated to be 9.4%. The 9.4% of 7°C insolubles were solubilized by a chemical solubilization method such as the method described in U.S. Pat. No. 3,163,539. According to this method, the cream was suspended in water so that it had about 10% solids concentration. It was then heated to 77°C and potassium hydroxide (about 22% by weight of tea solids) added to the extract until the pH was 11. The mixture was heated at 93°C for 20 minutes, cooled to 79°C and acetic acid (about 13% by weight of tea solids) was added to adjust the pH to 8.0. The mixture was cooled to 60°C, hydrogen peroxide (25% by weight of tea solids) was added and the temperature was maintained at about 60°C. Thereafter the mixture was heated slowly to 93°C, held at that temperature for 15 minutes, cooled to about 71°C, and acetic acid (about 8% based on the weight of tea solids) was added until a pH of 5.6 was reached. Thereafter, the mixture was cooled to 7°C and centrifuged at 8,500 rpm for 45 seconds. The combined liquors were then evaporated to 35% concentration in a rotary evaporator and dried in a Niro laboratory spray dryer.

The resulting dry powder, when made up to beverage strength in 7°c tap water, had excellent clarity, color and astringency.

EXAMPLE VIII

Black tea (225 g) was extracted for 10 minutes with 1500 ml of boiling water. The extract was filtered and then centrifuged while hot (75°C). The tea extract (0.67% tea solids concentration) was divided into two portions. To one portion was added 0.43% tannase from *Aspergillus oryzae* (14 units/mg activity), and both portions were incubated at 45°C for one hour.

The solutions were cooled; and the pH of the sample incubated with tannase, which had dropped to 4.5, was adjusted to the pH of the control (5.0), with sodium hydroxide solution.

Both portions were cooled in an ice water bath to 7°C and examined for turbidity, color, and taste. The sample incubated with the tannase was very clear, of excellent color and taste. The control sample was muddy in appearance and had a harsher taste than the tannase-treated sample.

EXAMPLE IX

A tea extract having a concentration of 10.4% solids was centrifuged (12,000 rpm) for 30 minutes at 3°C. In this way 33% of the tea solids were removed as cream. The cream was mixed with water to give a 4% suspension, to which tannase (from *Aspergillus oryzae*) was added (0.1 g/g. solids). The 4% suspension was then incubated at 45°C for 1 hour at pH of 5.7. After this, the suspension was centrifuged at 30°C to remove insolubles, and the clarified portion added to the original clarified extract. About 90% of the cream solids were solubilized by the tannase treatment, so that the combined clarified extracts contained about 96.7% of the original tea solids, and only 3.3% solids (insolubles) were discarded. The product (at 0.43% solids concentration) was clear and had a rich color and a reasonable tea flavor.

EXAMPLE X 20 mg of soluble tannase (*Aspergillus oryzae*, 14 units/mg) were bound to 500 mg of an insoluble hydrophilic copolymer based on acrylamide (Enzacryl AA, Koch-Light Ltd.). The method of binding used was one of two suggested by Koch-Light. This involved the activation of the aromatic-amino groups present in the copolymer by diazotisation with nitrous acid, and subsequent reaction with a solution of tannase in appropriate buffer over a period of 48 hours.

The insoluble tannase preparation had the appearance of a finely divided powder, and was most conveniently used in stirred suspension and recovered by centrifugation or filtration.

Tea liquor from black leaf was prepared as follows: 1500 ml boiling distilled water was added to 22.5g black leaf in a beaker, and allowed to stand for 8 minutes. The tea liquor (0.55% solids) was separated from the leaf by passing it through several thicknesses of butter muslin.

A 50 ml portion of this liquor was magnetically stirred with 500 mg of insoluble tannase preparation at 45°-50°C for 45 minutes. The liquor was separated from the enzyme preparation by filtration (Whatman No. 54). The liquor was cooled to 5°C, and compared with a control sample which had been subjected to the same treatment as described, excepting the addition of the enzyme preparation.

The tannase-treated liquor exhibited perfect clarity and good tea color at 5°C, while the control sample became very cloudy.

successive 50 ml portions of tea liquor were treated as above with the same insoluble tannase preparation until a total of one liter had been recovered. Each treated portion of tea liquor exhibited excellent clarity at 5°C. The enzyme preparation retained its initial activity, although some mechanical losses occurred during the period of its use.

EXAMPLE XI

A tea extract was prepared by extracting black tea with boiling distilled water for five minutes and filtering off the leaves through muslin. The resultant filtered extract had a concentration of 1.3% by weight.

To 75 ml of the tea extract were added 190 mg of tannase powder, prepared from *Aspergillus niger*, suspended in 19 ml of McIlvaine buffer (Phosphate-citrate buffer) at a pH of 5.5. The suspension was held at 30°C with occasional stirring for 70 minutes. A control sample was prepared, omitting the tannase powder. At the end of the incubation period, both samples were heated to 90°C and centrifuged at 3500 rpm at that temperature to remove the tannase powder. The samples were then cooled at 5°C and their clarity measured in a cloudometer. The cloudometer is constructed as follows: A coin with an 0.8 mm hole through the middle was placed in the bottom of a 100 ml measuring cylinder. The cylinder was placed on a translucent glass plate, illuminated by a 40-watt light bulb placed approximately 5 inches below the plate. The liquid to be tested was poured into the measuring cylinder and the depth (in milliliters on the cylinder scale) at which the light source just disappeared, was taken as the measurement of the clairity of the liquid. Thus, the following scale applies very roughly:

| | |
|---|---|
| Crystal clear | 100+ |
| Slightly hazy | 30 – 100 |
| Cloudy | 10 – 30 |
| Opaque | 0 – 10 |

After cloudometer measurements had been made, the samples were centrifuged at 5°C and 12,000 rpm for 30 minutes and the percentage undissolved solids determined. The results are given in the following table:

Table 6

|  | Visual Clarity | Cloudometer Reading | % Solids Undissolved |
|---|---|---|---|
| Treated sample at 5°C | Slightly hazy | 37 | 1.35% |
| Untreated sample at 5°C | Opaque | 8 | 7.50% |

Having described our invention, what we claim as new and desire to secure by Letters Patent is:

1. A process of preparing a tea extract which comprises:
   a. preparing a hot water extract of black tea,
   b. adjusting the temperature of the extract to within the range of about 25° to 55°C,
   c. adding tannase to the extract and permitting the tannase to remain in contact with the extract while maintaining said temperature range for a time sufficient to solubilize a substantial portion of the tea cream therein, and
   d. de-creaming the extract.

2. A process of preparing a tea extract which comprises:
   a. preparing a hot water extract of black tea,
   b. adding tannase to the extract and permitting the tannase to remain in contact with the extract while maintaining said extract at a temperature within the range of about 25° to 55°C for a time sufficient to solubilize a substantial portion of the tea cream therein.

3. A tea extract prepared in accordance with the process of claim 2.

4. Process for treating a tea extract containing, as a cold-water insoluble portion, tea cream to render more of the tea extract soluble in cold water comprising treating the tea cream by contacting the tea cream with a tannase enzyme preparation at a temperature sufficient to convert at least a portion of the tea cream to a cold-water soluble form and continuing the treatment for a time sufficient to reduce the cold-water insoluble portion to a desired level.

5. Process according to claim 4 wherein the treatment of the tea cream is conducted at a temperature of 25°–55°C while the tea cream is present in the tea extract using a matrix bound tannase enzyme preparation and after the treatment the enzyme is removed from the treated tea extract.

6. Process according to claim 4 wherein the tannase is produced from *Aspergillus oryzae*, *Aspergillus niger* or *Aspergillus flavus*.

7. Process according to claim 4 wherein the tea extract is centrifuged to separate tea cream from the extract, the separated tea cream is resuspended in an aqueous suspension, treated with the enzyme preparation, centrifuged to remove remaining cold-water insoluble solids and the cold-water soluble portion is added back to the supernatant.

8. Process according to claim 4 wherein the enzyme preparation remains in contact with the tea cream for an incubation period of at least 30 minutes.

9. Process according to claim 4 wherein the enzyme preparation is in soluble form.

10. Process according to claim 4 wherein the amount of enzyme is 0.5% by weight based on the weight of tea solids of an enzyme having an activity of 14 units per milligram.

11. Process according to claim 4 wherein the tea extract after treatment is subjected to centrifuging while the extract is maintained at a temperature of about 7°C to separate the remaining cold-water insoluble solids.

12. Process according to claim 4 wherein the tea cream to be treated is present in an aqueous tea extract.

13. Process according to claim 12 wherein the tea extract is a black tea extract.

14. Process according to claim 4 wherein the enzyme preparation is added to tea cream in a tea extract at a temperature within the range of 25°C to 55°C.

15. Process according to claim 14 wherein the temperature is about 45°C.

16. Process according to claim 4 wherein the pH of the tea extract is maintained between 4.0 and 7.0 during the enzyme treatment.

17. Process according to claim 16 wherein the pH is maintained within the range of 5.0 to 6.0.

18. Process according to claim 4 wherein the tea extract following the treatment is dried.

19. Process according to claim 18 wherein the method of drying the treated tea extract is spray-drying, vacuum-drying, or freeze-drying.

* * * * *